United States Patent
Coraluppi et al.

[11] B 3,918,975
[45] Nov. 11, 1975

[54] NAPHTHOLIC COUPLERS

[75] Inventors: Enzo Coraluppi; Elio de Saraca, both of Carcare; Lorenzo Vittore, Pietra Ligure, Italy

[73] Assignee: Minnesota Mining and Manufacturing Company, St. Paul, Minn.

[22] Filed: Dec. 1, 1972

[21] Appl. No.: 311,317

[44] Published under the Trial Voluntary Protest Program on January 28, 1975 as document no. B 311,317.

[30] Foreign Application Priority Data
Dec. 21, 1971 Italy ................................. 54921/71

[52] U.S. Cl. .................. 96/56.1; 96/9; 96/56.6; 96/66 R; 96/100
[51] Int. Cl.² .. G03C 7/00; G03C 7/04; G03C 1/40; G03C 5/30
[58] Field of Search ............. 96/100, 55, 56.1, 56.6, 96/9

[56] References Cited
UNITED STATES PATENTS
2,474,293  6/1949  Weissberger et al. ............. 96/55
2,706,684  11/1952 Graham et al. .................. 96/100
3,227,551  1/1966  Barr et al. ...................... 96/100
3,615,499  10/1971 Groet ............................ 96/56.6
3,667,956  6/1972  Iwama et al. .................... 96/100

Primary Examiner—Norman G. Torchin
Assistant Examiner—Richard L. Schilling
Attorney, Agent, or Firm—Alexander, Sell, Steldt & DeLaHunt

[57] ABSTRACT

Naphtholic couplers of the structural formula:

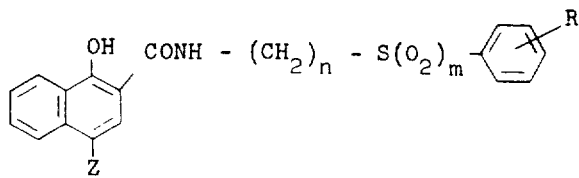

give rise to cyan dyes for use in color photographic elements upon color development.

11 Claims, No Drawings

NAPHTHOLIC COUPLERS

The present invention relates to couplers for color photography. More specifically it relates to naphtholic couplers which are suitable for incorporation either into color emulsions, or into color developing baths, and gives rise to cyan dyes upon color development.

It is known to the art that couplers of the naphtholic type are capable of reacting with the oxidation products of N,N-dialkyl-p-phenylene diamine type developers to form cyan images in silver halide photographic elements. It is greatly desired that such dye images be highly stable to light, heat and moisture.

The naphtholic type couplers, described in U.S. Pat. No. 2,474,293, give rise upon color development to dyes which exhibit an insufficient stability to heat and moisture.

It is an object of the present invention to provide naphtholic couplers which are capable of reacting with the oxidation product of a primary amine type developer, to form a dye which is highly stable to light, heat and moisture.

Briefly, the present invention relates to color couplers of the following formula:

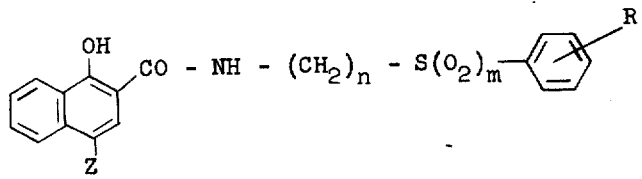

wherein:
R is H or an alkyl radical having 1–18 carbon atoms;
Z is H or a substituent which is expelled during the coupling reaction with an oxidation product of a primary amine developer; $m$ is 0–1; and $n$ is 1–4.

When R of the above described formula is equal to H or to an alkyl group having a low molecular weight, for example having 1–4 carbon atoms, the couplers of the present invention can be used as "bath couplers." When, on the other hand, R is equal to an alkyl with a high molecular weight, for example having 9–18 carbon atoms, the couplers of the present invention can be incorporated into the emulsion in aqueous solution or by the solvent dispersion technique.

Examples of groups which can be expelled during the coupling reaction are Cl, Br, COOH, SO$_3$H which affect the reactivity or solubility of the coupler, or a group having a specific activity on the photographic emulsion, like, for instance, a fog inhibitor or a masking group is intended. Hydrogen is also included amongst those groups which are expelled during reaction with an oxidation product of a primary amine developer.

For bath couplers, those couplers which are dissolved in the color developer are intended. They are therefore designed to be alkali-soluble, to diffuse easily into the appropriate layer and to give the desired colors by formation of dyes which do not diffuse under the processing conditions (see: C. E. Kenneth Mees and T. H. James, "The Theory of the Photographic Process," third edition, page 393).

In order to be incorporated into the emulsion, the couplers must be in a non-diffusing form. This is achieved by means of ballasting groups, such as alkyl-groups having 9–18 carbon atoms. In the case they must be incorporated into photographic emulsions in aqueous solution, the couplers must be made water-soluble, by means of solvating groups of the SO$_3$H and COOH type. In the case they must be incorporated into the emulsion by the solvent dispersion technique, the couplers must be soluble in substantially water-immiscible organic solvents. Such a technique which is now preferred is described for instance in U.S. Pat. Nos. 2,322,027; 2,801,170; 2,801,171; 2,870,012 and 2,991,177. Briefly the solvent dispersion technique involves first dissolving a coupler in a substantially water-immiscible organic solvent and then dispersing the so-prepared solution as extremely fine droplets in a hydrophilic colloidal binder. Gelatin is the preferred colloidal binder, but other polymeric colloidal binder materials, known to the art, can also be utilized. Obviously, when the couplers are incorporated into the emulsion by the solvent dispersion technique, the dyes derived therefrom upon color development are also contained (dispersed) in the emulsion, dissolved in the substantially water-immiscible organic solvent.

Development inhibiting groups, which can be introduced in the para position to the hydroxyl group, are described for instance in the French Pat. No. 1,257,887 and in its addition No. 78,161; in the French Pat. No. 1,224,012 and in its additions Nos. 75,676 and 77,306; and in the U.S. Pat. No. 3,364,022. Such groups are expelled during the coupling reaction and act therefore as development inhibiting groups.

The masking groups which can be introduced in the para position to the hydroxyl group are suitable for making an integral mask of a colored negative film, as described in U.S. Pat. No. 2,449,966. In accordance with such a process, a colored coupler, containing a chromophore group (Z, in our case) in the reaction position with the oxidation product of the p-phenylene diamine, is incorporated in at least one of the emulsion layers of the photographic element.

The chromophore group is split off during color development with the result that the residual radical is transformed into a dye (cyan dye, in our case), absorbing a major portion of light in one of the primary colors (main absorption: in the red region, in our case) and a minor portion in another region of the visible spectrum (secondary absorption: in the green region, in our case). The colored coupler, remaining in the unexposed parts of the layer, does absorb in the above mentioned green portion and does not absorb in the red one. With such a technique an element is obtained, which exhibits a uniform "masking coloration," which is substantially independent from the exposure and can be eliminated by filtration during the printing step of the positive photographic element.

The said masking technique is well-known to the man skilled in the art and is carried out in an improved way, employing uncolored couplers in conjunction with color couplers, as described for instance in the U.S. Pat. Nos. 2,428,054; 2,808,329; 2,860,975; and 2,852,370. Colored couplers having chromophore groups which can be usefully introduced into the couplers of the present invention, are for instance the azo-groups, like those described in the U.S. Pat. Nos. 2,521,908; 2,657,134; 2,706,684; 3,034,892.

It has been experimentally observed that the most useful couplers for an effective masking are those corresponding to the following formulae: x.15/17 wherein:

R is an alkyl having 9-18 carbon atoms; n is 1-4; X is CO-alkyl; Y is H or halogen; m is 0 - 1.

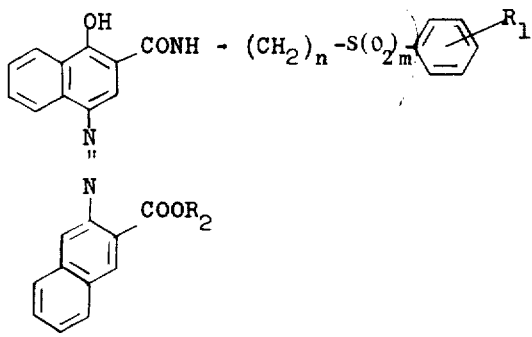

wherein:

$R_1$ is an alkyl having 9-18 carbon atoms; $R_2$ is an alkyl; n is 1-4; m is 0 - 1.

Upon color development with the above-mentioned developers, the couplers of the present invention give rise to dyes of the following formula:

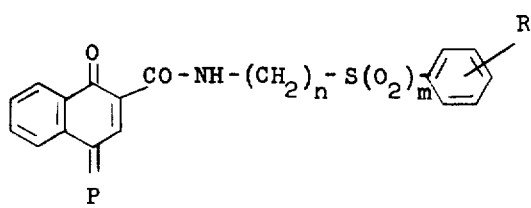

wherein:

P is a p-phenylene diamine residue; m is 0-1; n is 1-4; and R is H or an alkyl, having 1-18 carbon atoms.

According to the present invention, the above-mentioned dyes, which give rise to a photographic image in photographic silver halide elements, are particularly stable to light, heat and moisture. After exposure, such elements are developed with p-phenylene diamine type developers.

Briefly the present invention relates to silver halide photographic emulsions containing anti-diffusing couplers of the above-described formula, dissolved in a substantially water-immiscible organic solvent. It also relates to an exposed and developed silver halide photographic element, containing dyes of the above-described formula. More specifically it relates to an exposed and developed silver halide element containing dispersed dyes of the above-described formula, dissolved in a substantially water-immiscible organic solvent. It further relates to p-phenylene diamine color developing baths containing diffusing bath couplers of the above-described formula.

The meaning of Z in the formula that describes the bath couplers above must be obviously interpreted in view of what is known to those skilled in the art. Z is not for instance a masking group because colored couplers are embodied into the emulsion and not into the color developing bath, in accordance with the masking technique of colored films described before. As previously specified, bath-couplers must easily diffuse in the proper layer. It means that Z cannot be a ballasting group, acting as an anti-diffusing group in the molecule. Whatever Z may be, in this case it must not hinder the diffusion of the molecule, that is to say it may be either a development inhibiting group of the above-mentioned type or a group of the Cl, Br, COOH, and $SO_3H$ type.

Couplers of the present invention are for instance the following ones:

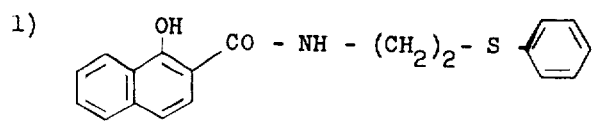

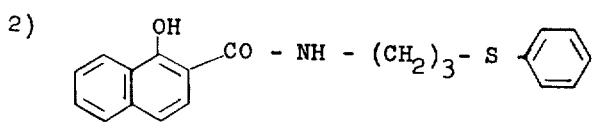

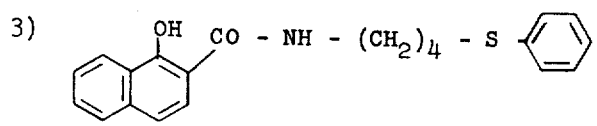

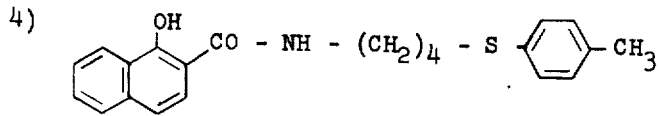

5) 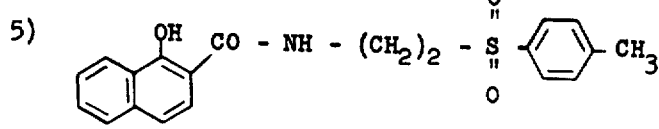
6) 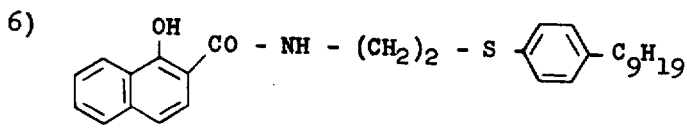
7) 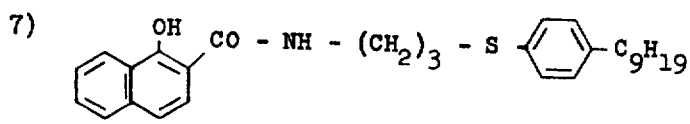
8) 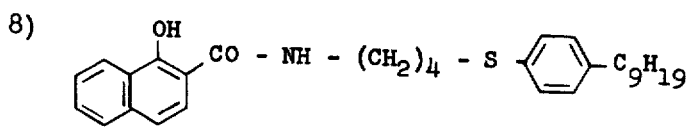
9) 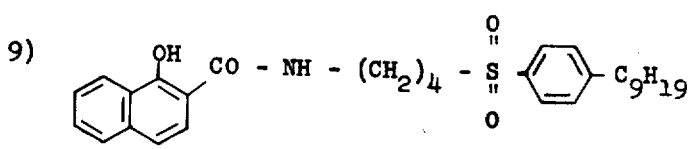
10) 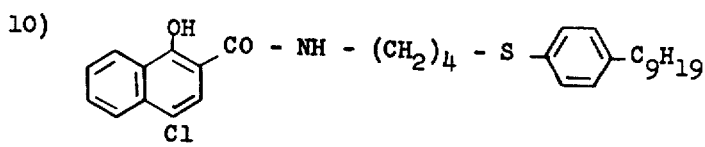
11) 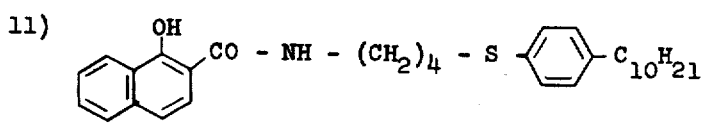
12) 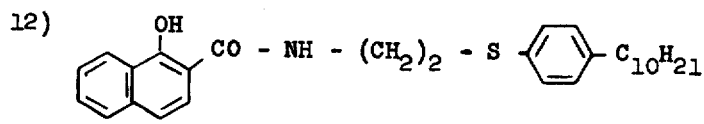
13) 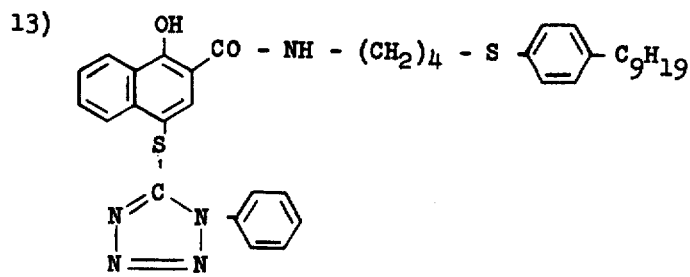

14) 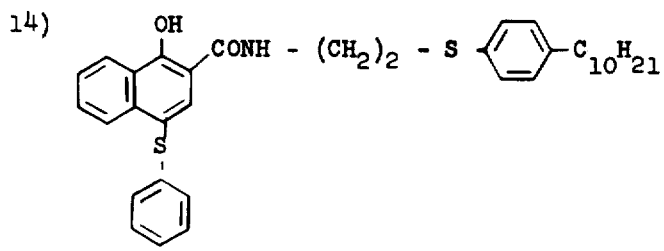
15) 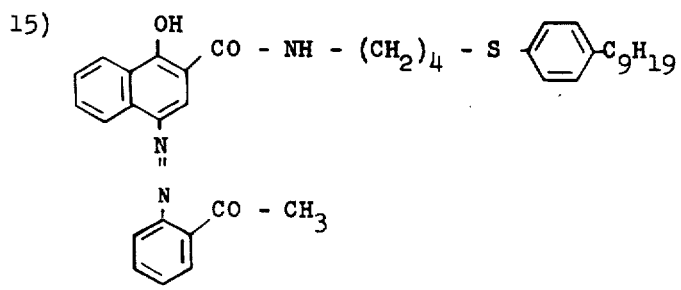
λ max = 505 mμ in ethanol
16) 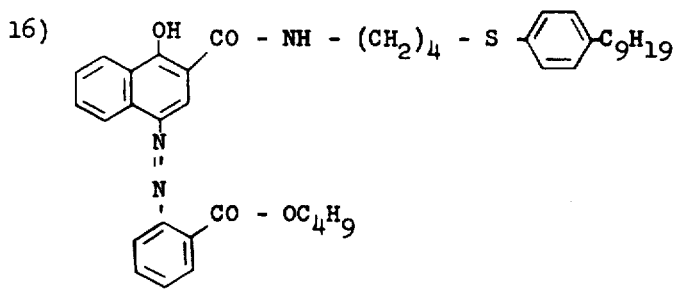
λ max = 496 mμ in ethanol
17) 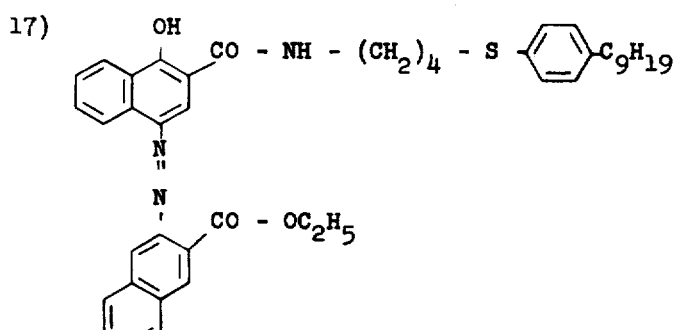
λ max = 510 mμ in ethanol
18) 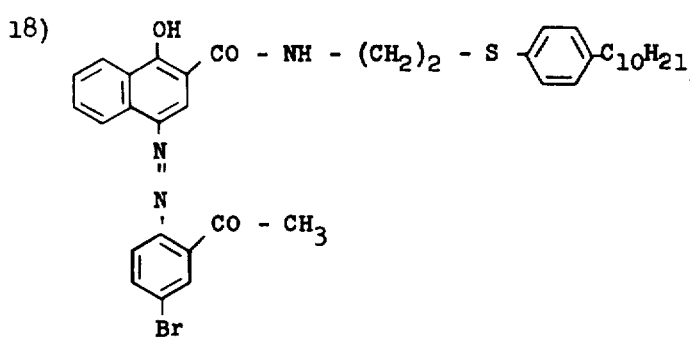
λ max = 505 mμ in ethanol 19) 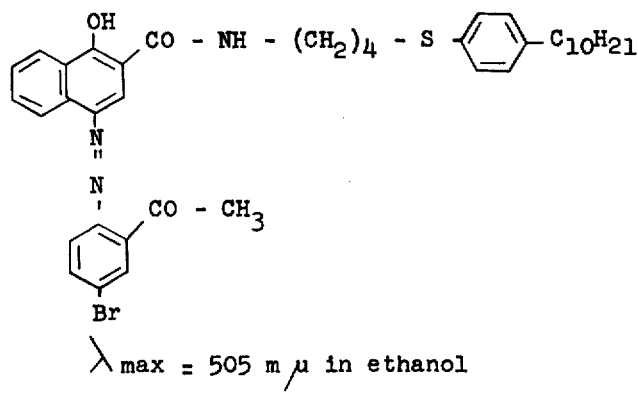
$\lambda$ max = 505 m$\mu$ in ethanol
20) 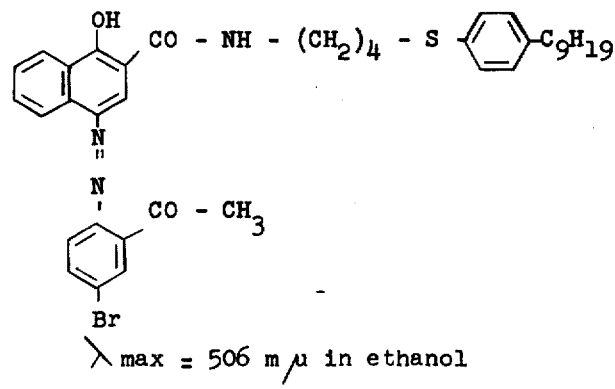
$\lambda$ max = 506 m$\mu$ in ethanol
The following couplers are similar couplers of the prior art (see: U.S. Pat. No. 2,474,293) which have been compared with those of the present invention:
The following examples will help to further describe the practice of the present invention.
A) 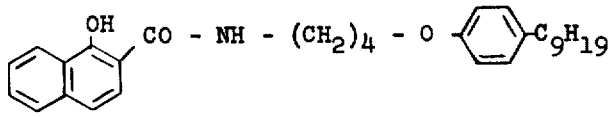
B) 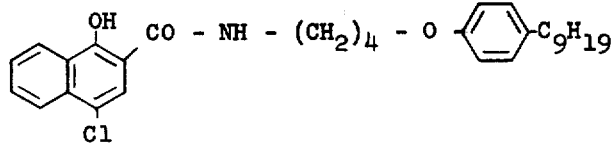
C) 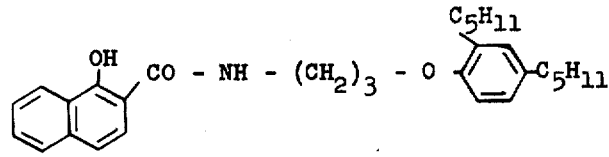
D) 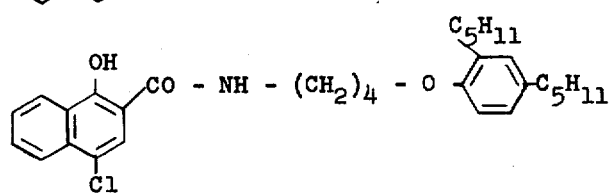
E) 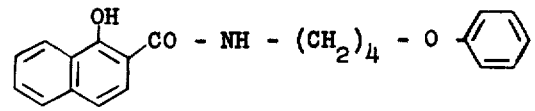
F) 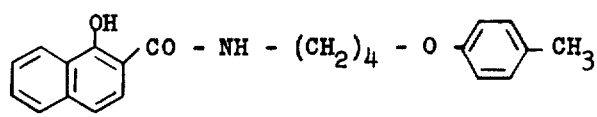

EXAMPLE 1

β-phenyl-thio-ethyl-amine 55.09 g. of thio-phenol (0.5 moles) and 250 ml. of absolute ethyl alcohol were introduced into a multi-neck flask provided with a stirrer, a condenser and a dropping funnel. 23 g. of Na (1 mol) were added thereto and, after the reaction, an alcohol solution of 102.4 g. of 2-bromoethylamine bromo-hydrate (0.5 moles) was dropped into the flask. After boiling and removal of the alcohol under vacuum, the residue was poured into $H_2O$. The oil, thus obtained, was extracted with ethyl ether; after evaporation of the ether, the residue was purified by distillation, thus obtaining 37 g. of the product (b.p. 116°–117°/2mm Hg).
Analysis: $NH_2$ % = 98.14.

1-oxy-N-[β-(phenyl-thio)-ethyl]-2-naphtamide 30.6 g. of β-phenyl-thio-ethyl-amine (0.2 moles) and 52.8 g. of phenyl 1-oxy-2-naphtoate (0.2 moles) were introduced into a Claysen flask. The mixture was melted and then the phenol, thus formed in the reaction, purified by distillation. The residue was crystallized from ethyl alcohol, thus obtaining 53.6 g. of the product (m.p. 91°–92°C).

| Analysis: | OH % = 99.50 | |
|---|---|---|
| | Calculated | Found |
| S% | 9.91 | 9.77 |

EXAMPLE 2

γ-phenyl-thio-propyl-amine

It was prepared like β-phenyl-thio-ethyl-amine of Example 1. In this case, 3-bromo-propyl-amine bromohydrate was used, thus obtaining 25.1 g. (b.p. 110°–112°/1.2 mm. Hg).

| Analysis: | $NH_2$ % = 98.61 | |
|---|---|---|
| | Calculated | Found |
| S% | 19.17 | 18.88 |

1-oxy-N-[γ-(phenyl-thio)-propyl]-2-naphtamide 36.7 g. of the above-mentioned compound were prepared like the compound of Example 1 (m.p. 95°–96°C).

| | Calculated | Found |
|---|---|---|
| C% | 71.19 | 70.30 |
| H% | 5.68 | 5.69 |
| N% | 4.15 | 4.19 |
| S% | 9.50 | 9.50 |

Analysis OH % = 98.13.

EXAMPLE 3

γ-phenyl-thio-butyrronitrile 110 g. of thiophenol (1 mol) and 500 ml. of ethyl alcohol were introduced into a multi-neck flask, provided with a stirrer, a condenser and a dropping funnel. 23 g. of metallic sodium (1 mol) were added thereto and after the sodium reaction, 103.5 g. of γ-chloro-butyrronitrile (1 mol) were dropped into the flask. After boiling the compound was poured into $H_2O$ and extracted with ethyl ether. After evaporation of the ether, the residue was distilled under vacuum, thus obtaining 137.6 g. of the product (b.p. 160°C/3 mm. Hg.).

| | Calculated | Found |
|---|---|---|
| N% | 7.90 | 7.66 |
| S% | 18.08 | 18.14 |

δ-phenyl-thio-butylamine 1,500 ml. of ethyl ether anhydrous and 28.5 g. of Li Al $H_4$ (0.75 moles) were introduced into a multi-neck flask, provided with a stirrer, a condenser and a dropping funnel. An ethereal solution of 88.6 g. of γ-phenyl-thio-butyrronitrile (0.5 moles) was prepared and then slowly added into the flask. After the reaction, the Lithium and Aluminum hydride, which had not reacted, was destroyed with caution by addition of $H_2O$ and NaOH. The suspension, thus obtained, was filtered and the residue repeatedly washed with ether; the ethereal solutions were washed until the washings were neutral and dried on sodium sulphate anhydrous. After evaporation of ether, the residue was purified by distillation under vacuum, thus obtaining 69.8 g. of the product (b.p. 152°–154°C/0.7 mm. Hg.).
Analysis: $NH_2$% = 99.

1-oxy-N-[δ-(phenyl-thio)-butyl]-2-naphtamide

With a similar process of Example 1, a product was obtained, having a melting point ranging from 99° to 101°C.

| Analysis: | OH% = 99.57 | |
|---|---|---|
| | Calculated | Found |
| S% | 9.11 | 9.07 |
| N% | 3.98 | 3.89 |

EXAMPLE 4

γ-4-methyl-phenyl-thio-butyrronitrile

It was prepared like γ-phenyl-thio-butyrronitrile (see Example 3), thus obtaining a product, having a b.p. ranging from 148° to 155°C/1 mm. Hg.

| Analysis: | Calculated | Found |
|---|---|---|
| C% | 69.17 | 68.77 |
| H% | 6.85 | 6.84 |
| N% | 7.32 | 7.12 |
| S% | 16.76 | 16.90 |

δ-4-methyl-phenyl-thio-butylamine

It was prepared like δ-phenyl-thio-butylamine (see Example 3), thus obtaining a product with a boiling point ranging from 130° to 135°C/0.8 mm. Hg.
Analysis: $NH_2$% = 98.57

1-oxy-N-[δ-(4-methyl-phenyl-thio)-butyl]-2-naphtamide

It was prepared like 1-oxy-N-[δ-(phenyl-thio)-butyl]-2-naphtamide of Example 1, thus obtaining a product with a m.p. ranging from 81° to 83°C.

| Analysis: | OH% = 100.4 | |
|---|---|---|
| | Calculated | Found |
| C% | 72.29 | 72.40 |
| H% | 6.34 | 6.36 |
| N% | 3.83 | 3.86 |
| S% | 8.77 | 8.80 |

EXAMPLE 5

4-tolyl-sulpho-acetonitrile 50 g. of sodium p-toluene-sulphonate tetrahydrate (0.2 moles), 200 ml. of propanol and 15 g. of chloroacetonitrile (0.2 moles) were introduced into a flask, provided with a condenser and then refluxed on a water-bath. After the reaction, the compound was filtered and then cooled at 0°C. The precipitate, thus formed, was filtered and dried, thus obtaining 29.2 g. of the product, which were suspended in dioxane. The suspension was heated lightly and NaOH added thereto until a complete solution was obtained. The solution was then poured into $H_2O$ and acidified with HCl, thus obtaining a precipitate, which was separated and dried. In such a way, 20.5 g. of the product were obtained (m.p. 146°–148°C). The material was crystallized from ethanol, thus obtaining 18.4 g. of the product, melting at 148°–150°C.

β-4-tolyl-sulpho-ethylamine

A suspension of 18.4 g. of 4-tolyl-sulpho-acetonitrile in ethyl-alcohol and 3 g. of Nickel-Raney were introduced into an autoclave. Hydrogen was then introduced thereinto until a pressure of 50 atm. was reached and the temperature increased up to 100°C. After the reaction, the autoclave content was removed, filtered to remove the Ni-Raney and the solvent distilled under vacuum. After distillation of the oily residue, 6.5 g. of the product were obtained (b.p. 140°–155°C/0.4 mm.).

1-oxy-N-[β-(4-tolyl-sulpho)ethyl]-2-naphtamide

The product was obtained like the one of Example 1. M.p. 166°–168°C.

| Analysis: | OH% = 98.44 | | |
|---|---|---|---|
| | | Calculated | Found |
| | N% | 3.79 | 3.59 |
| | S% | 8.67 | 8.48 |

EXAMPLE 6

β-4-nonyl-phenyl-thio-ethylamine

The compound was prepared like β-phenyl-thio-ethylamine of Example 1, using however a p-nonyl-thio-phenol "FLUKA," thus obtaining 57.4 of the product (b.p. 212°–217°C/18 mm. Hg.). Analysis: $NH_2\% = 95.5$.

1-oxy-N-[β-(4-nonyl-phenyl-thio)-ethyl]-2-naphtamide

It was obtained like the product of Example 1. After crystallization from acetonitrile, 62.4 g. of the product were obtained (m.p. 39°–41°C).

| Analysis: | OH% = 96.5 | | |
|---|---|---|---|
| | | Calculated | Found |
| | N% | 3.11 | 2.93 |
| | S% | 7.13 | 7.18 |

EXAMPLE 7

γ-4-nonyl-phenyl-thio-propylamine

It was prepared like β-4-nonyl-phenyl-thio-ethylamine of Example 6, using however 3-bromo-propylamine bromohydrate instead of 2-bromo-ethylamine bromohydrate, thus obtaining a product, having a b.p. ranging from 197° to 199°C/0.1 mm. Hg. Analysis: $NH_2\% = 98.39$.

1-oxy-N-[γ-(4-nonyl-phenyl-thio)-propyl]-2naphtamide

This product was prepared like 1-oxy-N-[β-(4-nonyl-phenyl-thio)-ethyl]-2-naphtamide of Example 6. In this case the product was crystallized from ethanol. M.p. 70°–73°C.

| Analysis: | OH% = 100.45 | | |
|---|---|---|---|
| | | Calculated | Found |
| | C% | 75.11 | 75.41 |
| | H% | 8.04 | 8.11 |
| | N% | 3.02 | 2.95 |
| | S% | 6.92 | 6.78 |

EXAMPLE 8

γ-4-nonyl-phenyl-thio-butyrronitrile

See Example 3 for the preparation of γ-phenyl-thio-butyrronitrile. In this case p-nonyl-thio-phenol FLUKA was used and 230 g. of the product were obtained. B.p. 202°–210°C/2.7 mm. Hg.

| Analysis: | Calculated | Found |
|---|---|---|
| N% | 4.61 | 4.53 |
| S% | 10.56 | 10.7 |

δ-4-nonyl-phenyl-thio-butylamine

See Example 3 for the preparation of δ-phenyl-thio-butylamine. 21.3 g. of the product were obtained. B.p. 195°–202°C/1.8 mm. Hg.

| Analysis: | $NH_2\% = 99.8$ | | |
|---|---|---|---|
| | | Calculated | Found |
| | C% | 74.33 | 73.7 |
| | H% | 10.81 | 10.60 |
| | N% | 4.55 | 4.55 |
| | S% | 10.42 | 10.85 |

1-oxy-N-[δ-(4-nonyl-phenyl-thio)-butyl]-2-naphtamide

See Example 1 for the preparation of the above-mentioned compound. It was crystallized from acetonitrile. M.p. 38°–39°C.

| Analysis: | OH% = 100.7 | | |
|---|---|---|---|
| | | Calculated | Found |
| | N% | 2.93 | 2.88 |
| | S% | 6.71 | 6.45 |

EXAMPLE 9

δ-4-nonyl-phenyl-thio-butylamine 78.5 g. of δ-4-nonyl-phenyl-thio-butyl-amine (0.254 moles) — see Example 8, 26.g. of acetic anhydride (0.254 moles) and 20.9 g. of sodium acetate anhydrous (0.254 moles) were introduced into a multi-neck flask provided with a stirrer and a condenser. After boiling under stirring, the mixture, thus obtained, was poured into $H_2O$ and ice. The water was decanted and the oily mass dissolved in ethyl ether. The solution was evaporated and the oily residue purified by distillation under vacuum, thus obtaining 70.3 g. of the product, boiling at 280°C/5.2 mm. Hg.

| Analysis: | Calculated | Found |
|---|---|---|
| C% | 72.14 | 71.88 |
| H% | 10.09 | 10.03 |
| N% | 4.00 | 4.30 |
| S% | 9.17 | 9.37 |

δ-4-nonyl-phenyl-sulpho-butylamine 67.5 g. of δ-4-nonyl-phenyl-thio-butylacetamine (0.193 moles) and glacial acetic acid were introduced into a multi-neck flask provided with a stirrer, a condenser and a dropping funnel. The mixture was refluxed and 135ml. of H₂O at 36% were dropped thereinto. After the oxidation reaction, the acetic acid was removed by distillation under vacuum. A hydroalcoholic solution of KOH5N was added to the oily residue and then refluxed until it was completely hydrolyzed. The solution was then poured into water and the oily product, having been separated, was extracted with ethyl ether. The ethyl ether was then removed by distillation and the oily residue (44 g.) used as it was.

1-oxy-N-[δ-(4-nonyl-phenyl-sulpho)-butyl]-2-naphtamide

See Example 1 for the preparation of the above-mentioned compound. The product thus obtained, was recrystallized from methanol. M.p. 104°–105°C.

| Analysis: | OH% = 100. | | |
|---|---|---|---|
| | | Calculated | Found |
| | C% | 70.69 | 70.37 |
| | H% | 7.71 | 7.64 |
| | N% | 2.74 | 2.70 |
| | S% | 6.29 | 6.54 |

EXAMPLE 10

1-oxy-4-chloro-N-[δ-(4-nonyl-phenyl-thio)-butyl]-2-naphtamide

The condensation between phenyl 1-oxy-4-chloro-2-naphtoate and δ-4-nonyl-phenyl-thio-butylamine was carried out as in Example 1. The condensation product was crystallized from methanol.
M.p. 43°–45°C.

| Analysis: | OH% = 99.29 | | |
|---|---|---|---|
| | | Calculated | Found |
| | C% | 70.37 | 70.48 |
| | H% | 7.47 | 7.49 |
| | Cl% | 6.92 | 6.87 |
| | N% | 2.73 | 2.67 |
| | S% | 6.26 | 6.27 |

EXAMPLE 11

γ-4-decyl-phenyl-thio-butyrronitrile

It was prepared like γ-4-nonyl-phenyl-thio-butyrronitrile (Example 8), using p-decyl-thiophenol [prepared as described in Zh. Obsheh. Khem. 34 (3) 993-995 (1964)].
B.p. 227°–236°C/1 mm. Hg.

| Analysis: | Calculated | Found |
|---|---|---|
| N% | 4.4 | 4.11 |
| S% | 9.74 | 10.09 |

δ-4-decyl-phenyl-thio-butylamine

It was prepared like δ-4-nonyl-phenyl-thio-butylamine (Example 8).
B.p. 208°–210°C/1 mm. Hg.
Analysis: NH₂% = 97.30.

1-oxy-N-[δ-(4-decyl-phenyl-thio)-butyl]-2-naphtamide

It was prepared like 1-oxy-N-[δ-(4-nonyl-phenyl-thio)-butyl]-2-naphtamide (Example 8). The crude product was crystallized from methanol. M.p. 29°–31°C.

| Analysis: | OH% = 98.34 | | |
|---|---|---|---|
| | | Calculated | Found |
| | C% | 75.72 | 75.76 |
| | H% | 8.40 | 8.35 |
| | N% | 2.84 | 2.78 |
| | S% | 6.52 | 6.38 |

1-oxy-N-[δ-(4-decyl-phenyl-thio)-ethyl]-2-naphtamide

It was prepared like the product of Example 6. In this case, p-decyl-thio-phenol was used as a starting product.
Analysis:OH% = 99.0

EXAMPLE 13

1-oxy-4-(-1-phenyl-5-tetrazolil-thio)-N-[δ-(4-nonyl-phenyl-thio)-butyl]-2-naphtamide.

42.52 g. of bis-(1-phenyl-5-tetrazolil)-disulphide (0.12 moles) — prepared as described in Berichte 28, 81 — and carbon tetrachloride were introduced into a flask provided with a bubbler and condenser, chlorine was then bubbled into the suspension until a complete solution was reached. The solvent was evaporated and the residual orange oil was dissolved in carbon tetrachloride. The solution, thus obtained, was added to a carbon tetrachloride solution of 114.6 g. of 1-oxy-N-[δ-(4-nonyl-phenyl-thio)-butyl]-2-naphtamide (0.24 moles), which was prepared in another flask provided with a condenser and a stirrer. After boiling the solvent was removed and the solid residue crystallized from methyl alcohol and further from isopropylic alcohol.
M.p. 112°–115°C.

| Analysis: | OH% = 100.37 | | |
|---|---|---|---|
| | | Calculated | Found |
| | N% | 10.70 | 10.70 |
| | C% | 67.84 | 67.95 |
| | H% | 6.70 | 6.63 |

EXAMPLE 14

1-oxy-4-phenyl-thio-N-[β-(4-decyl-phenyl-thio)-ethyl]-2-naphtamide

A solution of 69.5 g. of 1-oxy-N-[β-(4-decyl-phenyl-thio)-ethyl]-2-naphtamide (0.15 moles) in 500 ml. of carbon tetrachloride, being dried on CaCl₂, was introduced into a multi-neck flask provided with a stirrer, a condenser and a dropping funnel. Another solution of 21.7 g. of sulphinil chloride (0.15 moles) in 150 ml. of carbon tetrachloride was dropped thereinto at room temperature (25°C.). The mixture was then refluxed for 4 hours. The solvent was removed by distillation under water pump vacuum; the oily residue was crystallized from acetonitrile; and finally an oily product was separated by cooling the mixture. Such a product, after the solvent was decanted, was dried in a stove, thus obtaining 67.5 g. of an oily, thick and very dark product.
Yield = 78.6%

| Analysis: | Calculated | Found |
|---|---|---|
| C% | 73.51 | 73.31 |
| H% | 7.23 | 7.08 |
| N% | 2.45 | 2.69 |

EXAMPLE 15

1-oxy-4-(2-acetyl-phenyl-azo)-N-[δ-(4-nonyl-phenyl-thio)-butyl]-2-naphtamide 6.75 g. of 2-amino-acetophenon (Schuchard), — 0.05 moles —, 20 ml. of concentrated HCl and 60 ml.

of H₂O were placed into a beaker provided with a stirrer and a thermometer. The solution, thus obtained, was cooled at a temperature ranging from 0° to 5°C and a solution of 3.7 g. of sodium nitrite (0.0535 moles) dissolved in 23 ml. of water added thereto.

After removal of the nitrous acid surplus by addition of sulphammic acid, the solution was dropped under stirring into a pyridine solution of 23.85 g. of 1-oxy-N-[δ-(4-nonyl-phenyl-thio) -butyl]-2-naphtamide (0.05 moles), previously prepared in a beaker keeping the temperature at 0°C. After standing and pouring the solution into H₂O, the precipitate was filtered, washed and dried, thus obtaining 24 g. of the product. M.p. 127°-131°C.

λmax = 505 in ethyl alcohol.

| Analysis: | OH% = 99.08 | | |
|---|---|---|---|
| | | Calculated | Found |
| | C% | 73.16 | 73.42 |
| | H% | 7.27 | 7.33 |
| | N% | 6.73 | 6.69 |
| | S% | 5.14 | 5.13 |

EXAMPLE 16

1-oxy-4-(2-carbobutyloxy-phenyl-azo)-N-[γ-(4-nonyl-phenyl-thio)-butyl]-2-naphtamide It was prepared like the product of Example 15, using however, butyl -2-amino benzoate instead of 2-amino-acetophenon. M.p. 124°-126°C.

λmax = 496 in ethyl alcohol.

| Analysis: | OH% = 101. | | |
|---|---|---|---|
| | | Calculated | Found |
| | C% | 72.20 | 71.70 |
| | H% | 7.53 | 7.49 |
| | N% | 6.16 | 6.13 |

EXAMPLE 17

1-oxy-4-(3-carboethoxy-2-naphtylazo)-N-[δ-(4-nonyl-phenyl-thio)-butyl]-2-naphtamide It was prepared like the product of Example 15, using however, ethyl 2-amino-3-naphtoate, instead of 2-amino-acetophenon. M.p. 144°-147°C.

Analysis:OH% = 98.85

λmax = 510 in ethyl alcohol.

| | Calculated | Found |
|---|---|---|
| C% | 73.36 | 73.55 |
| H% | 7.01 | 7.06 |
| N% | 6.00 | 6.02 |

EXAMPLE 18

1-oxy-4-(2-acetyl-4-bromo-phenylazo)-N-[β-(4-decyl-phenyl-thio)-ethyl]-2-naphtamide It was prepared like the product of Example 15, using 2-amino-5-bromo-acetophenon as a amine, which was obtained by acid hydrolysis of acetyl derivative (s. Org. Chem. 1941, page 410) and the product of Example 12. M.p. 114°-117°C.

Yield = 75%.

λmax = 505 in ethyl alcohol.

| | Calculated | Found |
|---|---|---|
| C% | 64.52 | 64.85 |
| H% | 6.14 | 6.13 |
| Br% | 11.60 | 11.53 |
| N% | 6.10 | 6.11 |
| S% | 4.66 | 4.65 |

EXAMPLE 19

1-oxy-4-(2-acetyl-5-bromo-phenylazo)-N-[δ-(4-decyl-phenyl-thio)-butyl]-2-naphtamide It was prepared like the product of Example 18, using the compound of Example 11. M.p. 106°-109°C.

λmax = 505 in ethanol.

| Analysis: | OH% = 101.11 | | |
|---|---|---|---|
| | | Calculated | Found |
| | N% | 5.85 | 5.80 |

EXAMPLE 20

1-oxy-4-(2-acetyl-5-bromo-phenylazo)-N-[δ-(4-nonyl-phenyl-thio)-butyl]-naphtamide It was prepared like the product of Example 18, using the compound of Example 8. M.p. 114°-116°C.

λmax = 506 in ethyl alcohol.

| Analysis: | OH% = 99.90 | | |
|---|---|---|---|
| | | Calculated | Found |
| | N% | 5.98 | 5.89 |

The couplers of the present invention may be used in conjunction with many types of silver halide emulsions suitable for color photography. They can be used for instance in silver bromide, silver chloride or silver iodide emulsions or in those emulsions containing a halide mixture, such as silver bromoiodide or silver chloro-bromide emulsions. The couplers can also be used in those emulsions which are described in U.S. Pat. Nos. 2,592,243 and 2,698,794. Such couplers can still be used in those emulsions capable of forming an image on the surface or in the interior of the silver halide grains, such as those described in U.S. Pat. No. 2,592,250.

As it is known to the man skilled in the art, the above-mentioned emulsions can be chemically sensitized either by addition of sulphur compounds, as described for instance in U.S. Pat. Nos. 1,574,944; 1,623,469 and 2,410,689, and/or by addition of noble metal salts, such as rhutenium, rhodium, iridium, platinum and palladium; or by addition of Au salts, as described in U.S. Pat. No. 2,399,083. They can be stabilized with Au salts, as described in U.S. Pat. Nos. 2,597,856 and 2,597,915. The above-mentioned emulsions can be optically sensitized with cyanine and merocyanine dyes, like those described in U.S. Pat. Nos. 1,846,301; 1,846,302; 1,942,854; 1,990,507; 2,066,967; 2,112,140; 2,107,379; 2,165,338; 2,493,747; 2,493,748; 2,503,776; 2,519,001; 2,666,761; 2,734,900; 2,739,149; 2,739,964; and in British Pat. Nos. 450,958 and 466,246.

The emulsions can contain organic stabilizers and anti-foggants of the cylic amine type, iminoazoles, such as mercaptobenzimidazole; triazoles, such as those described in U.S. Pat. No. 2,444,608; azaindenes, such as those described in U.S. Pat. Nos. 2,444,605, 2,444,606; 2,444,609; 2,450,397; 2,713,541; 2,716,062; 2,735,769; 2,743,181; 2,756,147; 2,772,164 and E. J. Birr in Z. Wiss, Phot. 472 (1952); tetrazoles, such as 1-phenyl-5-mercapto-tetrazole, thiazoles and benzothiazoles, such as 1-methylbenzothiazole and benzothiazole quaternary salts, as described in U.S. Pat. No. 2,131,038; mercapto-benzothiazoles, such as 1-methyl-mercapto-benzothiazole; oxazoles; thiosemicarbazides; pyrimidines; iodonium derivatives; benzensulphyn acids; inorganic stabilizers of the zinc and cadmium salt type, such as those described in U.S. Pat. No. 2,839,405.

The emulsions can further contain any suitable plasticizer, known to the man skilled in the art, such as glycerin.

The emulsion may be hardened with any suitable hardener for gelatin, known to the man skilled in the art, such as aldehydes of the formaldehyde, glyoxale, succinic, glutaric and resorcylic aldehyde type; and halogen substituted aliphatic acids, such as mucochloric and mucobromic acids, as described in U.S. Pat. No. 2,080,019; or mixture thereof, as described in U.S. Pat. No. 2,591,542.

The emulsions may have been supplied with a coating aid, known to the man skilled in the art, such as saponin. Any suitable base type, known to the man skilled in the art, can be used, such as cellulose triacetate, polyester, paper, polytenated paper. In the preparation of the silver halide dispersions, employed for preparing silver halide emulsions, there may be employed as the dispersing agent for the silver halide in its preparation, gelatin or another water permeable means of the colloidal albumin type, a cellulose derivative, or a synthetic resin of the polyvinyl type. Such material types are described for instanace in U.S. Pat. Nos. 2,286,215; 2,328,808; 2,322,085; 2,527,872; 2,541,474; 2,563,791; 2,768,154; 2,808,331; 2,852,382.

If desired, a mixture of two or more of these colloids may be employed for dispersing the silver halide in its preparation.

The developing baths to be used in conjunction with the couplers of the present invention are well-known to the man skilled in the art. They contain a developer of the p-phenylene diamine type, a development restrainer of the potassium bromide type, an antioxidant, such as sodium sulphite and an alkaline agent of the alkali hydrate or carbonate type. They may further contain both an antifoggant of the benzimidazole type and derivatives, of the benzothiazole type and derivatives, of the triazole and tetrazole type and derivatives, such as mercapto-derivatives; and an anticalcium substance of the alkaline phosphate and alkylenediaminopolyacetic acid type, such as for instance EDTA. Compounds, known to the man skilled in the art, of the p-phenylene diamine type are those described for instance in U.S. Pat. Nos. 2,193,015; 2,656,273; 2,875,049 and in C. E. Kenneth Mees and T. H. James, "The Theory of the Photographic Process," third edition, table 13.4, pages 294–295.

Suitable developers, which can be employed to develop photographic elements, containing the couplers of the present invention, are the sulphites, the hydrochlorides and the sulphates of:

a. N,N-diethyl-p-phenylene diamine
b. N-ethyl,N-β-methansulphonamido-ethyl-3-methyl-4-aminoaniline
c. N-ethyl,N-hydroxyethyl-2-methyl-p-phenylene diamine
d. N-ethyl,N-hydroxyethyl-p-phenylene diamine
e. N,N-diethyl-2-methyl-p-phenylene diamine.

EXAMPLE 21

Couplers 6, 7, 8, 9 and 10 of the present invention and those A, B, C and D, outside the present invention, were tested in the following way:

2 g. of a coupler were dissolved in 6 ml. of dibutylphtalate and 12 ml. of ethyl acetate. The solution, thus obtained, was emulsified with 40 ml. of a 4% gelatin solution, in accordance with the prior art. The emulsion was then diluted with water up to 100 ml. and a fraction thereof, containing 0.002 moles of the coupler, was mixed with 200 ml. of a 7% gelatin bromo-chloride emulsion. The resulting emulsion was further coated on a polyester base.

The emulsion specimens, each containing a different coupler, were then exposed to a red light through a decreasing grey step wedge and then developed in a developing bath, corresponding to the following formula:

| | |
|---|---|
| sodium hexametaphosphate | 2 g. |
| sodium sulphite (anhydrous) | 4 g. |
| N,N-diethyl-2-methyl-p-phenylene diamine hydrochloride | 3 g. |
| sodium carbonate monohydrate | 20 g. |
| potassium bromide | 2 g. |
| water to make 1,000 ml. | |

The specimens were washed, bleached, washed, fixed, washed and dried.

Some specimens, thus obtained, were exposed to a Xenon lamp in a fadeometer for 10 hours, others were incubated for 24 hours at 90°C and 75% relative humidity.

The specimens were all stable to light at the same extent, but a decrease ( $\Delta$ ) of the optical density (D) occurred at moist heat, as shown in Table 1, wherein:

$$\Delta D\% = (\text{initial D} - \text{final D})/\text{initial D} \times 100$$

TABLE 1

| Couplers | $\Delta D\%$ |
|---|---|
| 6 | 8.4 |
| 7 | 8.4 |
| 8 | 5 |
| 9 | 12 |
| 10 | 4 |
| A | 18 |
| B | 16 |
| C | 17.5 |
| D | 24.7 |

Densities were then read at a conventional densitometer.

EXAMPLE 22

Couplers 3 and 4 of the present invention were compared with couplers E and F, known to the prior art, in the following way:

A specimen of an emulsified photographic element, containing silver halide, was exposed to the light and then developed in a color developing bath containing:

| | |
|---|---|
| sodium sulphite anhydrous | 0.5 g. |
| sodium carbonate | 10 g. |
| N-ethyl-N-β-methansulphonamidoethyl-3-methyl-4-amino-aniline | 1 g. |
| coupler dissolved in 10 ml. of ethanol | 2 g. |
| water to make 1,000 ml. | |

The specimen was then washed, bleached, washed, fixed, washed again and dried, thus obtaining a cyan image by dye formation.

The specimens, containing the four couplers (3, 4, E, F) were incubated for 24 hours at 90°C and 75% relative humidity.

Table 2 shows the optical density decrease ($\Delta D$):

Table 2

| Couplers | $\Delta D\%$ |
|---|---|
| 3 | 7 |
| 4 | 4.5 |
| E | 12.5 |
| F | 10.8 |

EXAMPLE 23

A colored multi-layer film has been obtained by using a negative type silver halide emulsion in accordance with the following steps:

1. The dibutylphtalate solution of Example 12 was dispersed in gelatin.
2. The dibutylphtalate solution of Example 18 was dispersed in gelatin.
3. Both dispersions were added to a negative silver halide emulsion which had been sensitized to the red.
4. The emulsion of step 3, thus modified, was coated on a transparent base.
5. A gelatin layer was coated over the sensitive emulsion layer.
6. A dibutylphtalate solution of 1-phenyl-3-[4-(4-dodecylanilino-sulpho)-phenyl-ureido]-5-pyrazolone was dispersed in gelatin.
7. A dibutylphtalate solution of 1-phenyl-3-[4-(4-dodecylanilino-sulpho)-phenyl-ureido]-4-(4-methoxy-phenylazo)-5-pyrazolone was dispersed in gelatin.
8. Both dispersions (6 and 7) were added to a negative silver halide emulsion, being sensitized to the green.
9. The emulsion of step 8, thus modified, was coated as described in steps 4 and 5.
10. A colloidal silver layer, acting as a filter for the blue radiations was coated thereon (step 9).
11. A dibutylphtalate solution of α-(2-stearoxy-benzoil)-2-Cl-5-sulpho-phenyl-acetanilide was dispersed in gelatin and further added to a negative silver halide emulsion, which had not been optically sensitized.
12. The emulsion, thus modified, was coated as described at step 10.
13. A gelatin layer was coated on the emulsion of step 12, as a protective layer.

The film, thus obtained, was exposed and further processed in a color developing bath, containing N-ethyl,N-β-methansulphonamidoethyl-3-methyl-4-aminoaniline, then washed, bleached with potassium ferrocyanide, rewashed, fixed in a hyposulphite bath and finally washed.

A three color negative image was formed, which exhibited a color correction, being stable to light and moist heat.

In the use of the couplers of this invention, the only required function of the group Z is to enable the naphtalic coupler to couple with an oxidized primary aromatic amine color developer through the 4-position where Z is located. The Z group in that para position has already been discussed with regard to the wide variety of groups known in the art to be used in that coupling position.

Z may also be the group —S—R² where R² is an aryl group or an etherocyclic group. When the couplers of this invention are incorporated into silver halide emulsion layers (preferably with a structural base support layer), exposed, and developed with a primary aromatic amine color developer, such as for example p-phenylene diamine, dye products are formed having the general structural formula

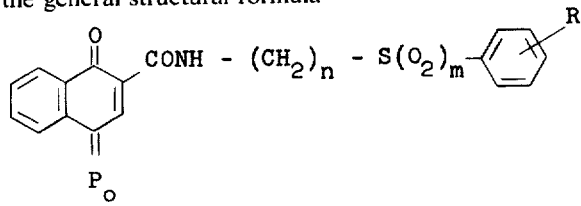

wherein:
m, n, and R are as above and $P_o$ is the residue of an oxidized primary amine color developing agent which has coupled with the couplers of the present invention.

The preferred use for the present compounds is as dye forming couplers for photographic emulsions. This includes the use of these couplers as dispersed couplers, dissolved in a substantially water-immiscible organic solvent. This type of photographic element is well known in the art.

What we claim is:

1. A silver halide photographic emulsion containing at least one coupler of the formula:

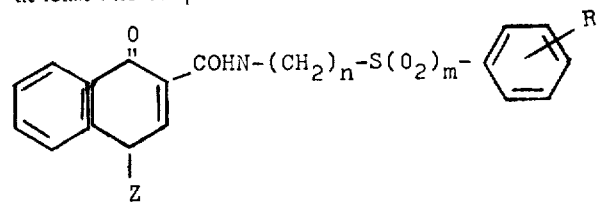

wherein R is hydrogen or an alkyl radical having 1–18 carbon atoms; Z is hydrogen or a substituent which is expelled during the coupling reaction with an oxidation product of a primary amine developer; m is 0 and 1; n is 1, 2, 3 and 4.

2. The silver halide photographic emulsion of claim 1 wherein the at least one coupler is dissolved in a substantially water-immiscible organic solvent.

3. A p-phenylene diamine color developing bath containing at least one coupler of the formula:

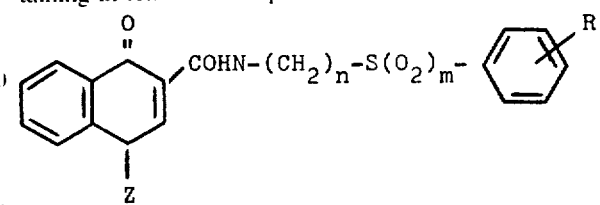

wherein R is hydrogen or an alkyl radical having 1–18 carbon atoms; Z is hydrogen or a substituent which is expelled during the coupling reaction with an oxidation product of a primary amine developer; m is 0 and 1; and n is 1, 2, 3 and 4.

4. A silver halide photographic element including a base and at least one emulsion layer which contains at least one dye deriving from a coupler of the formula:

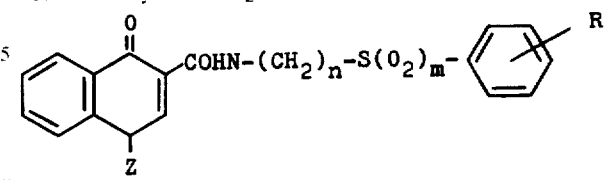

wherein R is hydrogen or an alkyl radical having 1–18 carbon atoms; Z is hydrogen or a substituent which is expelled during the coupling reaction with an oxidation product of a primary amine developer; m is 0 and 1; and n is 1, 2, 3 and 4
upon color development with a p-phenylene diamine color developer.

5. A photographic element including a base and at least one silver halide emulsion layer of claim 1.

6. A photographic element containing the silver halide emulsion layer of claim 1 and wherein the coupler is a dispersed coupler with R being an alkyl radical of 9–18 carbon atoms.

7. A photographic element containing the silver halide emulsion layer of claim 1 wherein Z is a development inhibiting group.

8. The photographic element of claim 7 wherein the development inhibitor group is —S—R² wherein R² is an aryl or etherocycle group.

9. The photographic element of claim 5 wherein R is an alkyl group having 1–4 carbon atoms.

10. The photographic element of claim 5 wherein Z is an arylazo group.

11. The photographic element of claim 10 wherein is an alkyl group having 9–18 carbon atoms.

* * * * *

UNITED STATES PATENT AND TRADEMARK OFFICE
CERTIFICATE OF CORRECTION

PATENT NO. : 3,918,975
DATED : November 11, 1975
INVENTOR(S) : Enzo Coraluppi, Elio de Saraca & Lorenzo Vittore It is certified that error appears in the above-identified patent and that said Letters Patent are hereby corrected as shown below:

Col. 3, line 6, delete "v. 15/17" and insert

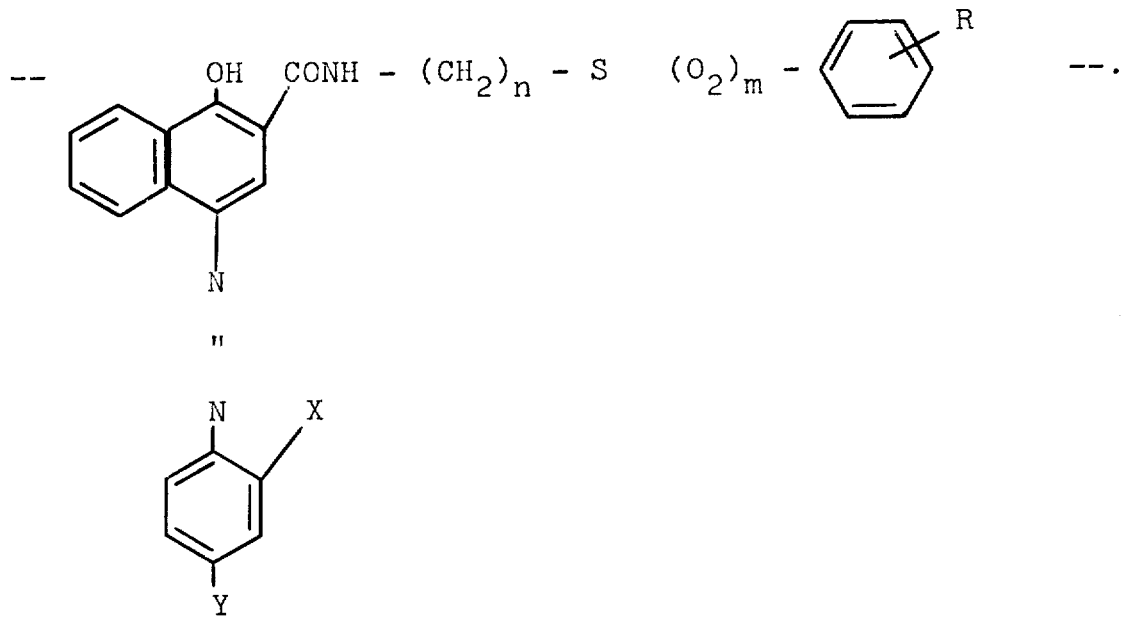

Signed and Sealed this first Day of June 1976

[SEAL]

Attest:

RUTH C. MASON
Attesting Officer

C. MARSHALL DANN
Commissioner of Patents and Trademarks